US009070294B2

(12) United States Patent
Wyble et al.

(10) Patent No.: US 9,070,294 B2
(45) Date of Patent: Jun. 30, 2015

(54) AUTOMATED WARNING METHODS AND SYSTEMS FOR THE PREVENTION OF ANIMAL-VEHICLE ACCIDENTS

(71) Applicant: Xerox Corporation, Norwalk, CT (US)

(72) Inventors: Thomas J. Wyble, Williamson, NY (US); Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 186 days.

(21) Appl. No.: 13/895,962

(22) Filed: May 16, 2013

(65) Prior Publication Data

US 2014/0340239 A1 Nov. 20, 2014

(51) Int. Cl.

| | |
|---|---|
| ***G08G 1/01*** | (2006.01) |
| ***G08G 1/09*** | (2006.01) |
| ***G08G 1/095*** | (2006.01) |
| ***G06F 17/10*** | (2006.01) |
| ***G08G 1/0967*** | (2006.01) |
| ***G08G 1/0962*** | (2006.01) |
| *G08G 1/16* | (2006.01) |

(52) U.S. Cl.

CPC ...... *G08G 1/096783* (2013.01); *G08G 1/09623* (2013.01); *G08G 1/096716* (2013.01); *G08G 1/096741* (2013.01); *G08G 1/164* (2013.01)

(58) Field of Classification Search

None

See application file for complete search history.

(56) References Cited

U.S. PATENT DOCUMENTS

| | | | |
|---|---|---|---|
| 5,979,586 | A | 11/1999 | Farmer et al. |
| 6,252,496 | B1 | 6/2001 | Jackson |
| 7,042,340 | B2 | 5/2006 | Ewert et al. |
| 7,098,775 | B2 | 8/2006 | Perlo et al. |
| 7,303,041 | B2 | 12/2007 | Stuve |
| 8,082,101 | B2 | 12/2011 | Stein et al. |
| 2012/0203418 | A1 | 8/2012 | Braennstroem et al. |
| 2012/0326917 | A1 | 12/2012 | Kiehne |

OTHER PUBLICATIONS

Huijser, M. P. et al., "Wildlife-Vehicle Collision Reduction Study: Report to Congress," Report No. FHWA-HRT-08-034 (Aug. 2008), Montana State University, Western Transportation Institute, Bozeman, Montana, 254 pages.

Page, M A., "A Toolkit for Reducing Wildlife & Domestic Animal-Vehicle Collisions in Utah," TRB 2006 Annual Meeting (2005) Utah Department of Transportation, Nov. 14, 22 pages.

Sullivan, J. M., "Relationships between Lighting and Animal-Vehicle Collisions," Report No. UMTRI-2009-35 (Oct. 2009), The University of Michigan, Transportation Research Institute, Ann Arbor, Michigan, 26 pages.

*Primary Examiner* — Julie Lieu

(74) *Attorney, Agent, or Firm* — Kermit D. Lopez; Luis M. Ortiz; Ortiz & Lopez, PLLC

(57) ABSTRACT

Methods and systems for preventing collisions between vehicles and moving hazards include the use of active signs, a network of sensors, and a controller. Such sensors can be placed adjacent to a roadway and are used to detect the presence of animals. The active signs display a local speed limit. The controller accepts the sensor signals as input and outputs display commands to the active signs. The controller maintains a rolling window of recent detections in histogram form. The recent data, together with a control law specified by the municipal authority, can be used to specify updated local speed limits to influence driver behavior.

20 Claims, 5 Drawing Sheets

AUTOMATED WARNING METHODS AND SYSTEMS FOR THE PREVENTION OF ANIMAL-VEHICLE ACCIDENTS

FIELD OF THE INVENTION

Embodiments are generally related to collision avoidance systems. Embodiments are also related to the monitoring of roads and highways to prevent collisions between vehicles and animals or other hazards.

BACKGROUND

A significant and ongoing cause of vehicle damage and risk to life and limb on roadways is animal-vehicle crashes. Of particular concern are animal-vehicle crashes involving large animals such as deer, which occur at highway speeds. Typically, such crashes result from large animals wandering or dashing in a panic onto a roadway in front of an oncoming vehicle. At highway speeds, the speed of the vehicle makes it almost impossible for the driver to avoid a crash in many cases. This is particularly true since many animals, such as deer, are most active in the low light conditions of dawn and dusk, times at which visibility is reduced and, therefore, available driver reaction time is reduced even further. Costly and dangerous animal-vehicle crashes can occur, however, at any time of day and even at less than full highway speeds.

There are many animal species which are involved in animal-vehicle collisions. Among large species, deer are the most commonly involved. In the year 2000, there were 247,000 documented automobile collisions involving deer across the US. Deer-vehicle collisions result in about 200 human deaths and $1.1 billion in property damage each year. State and federal governments, insurance companies, and drivers spend an additional $3 billion in an effort to reduce the number of deer-vehicle collisions. Current methods aimed at collision avoidance include mirrors to reflect car headlights in an effort to keep animals away from roads, fencing, car mounted whistles, warning signs, and other methods such as underpasses allowing animals to cross under a roadway. Despite these countermeasures, collisions continue to occur as motorists and wildlife increasingly encroach upon each other.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide improved collision avoidance methods and systems.

It is another aspect of the disclosed embodiments to provide for methods and systems for preventing collisions between vehicles and animals and/or other hazards.

The aforementioned aspects and other objectives and advantages can now be achieved as described herein. Methods and systems for preventing collisions between vehicles and moving hazards are disclosed herein and include the use of active signs, a network of sensors, and a controller. Such sensors can be placed adjacent to a roadway and are used to detect the presence of animals. The active signs display a local speed limit. The controller accepts the sensor signals as input and outputs display commands to the active signs. The controller maintains a rolling window of recent detections in histogram form. The recent data, together with a control law specified by the municipal authority, is used to specify local speed limits. It is expected that drivers will have greater compliance to a posted speed limit than to static or flashing signs, since the municipality has an enforcement mechanism (local speeding) to influence driver behavior.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

Figure 1:
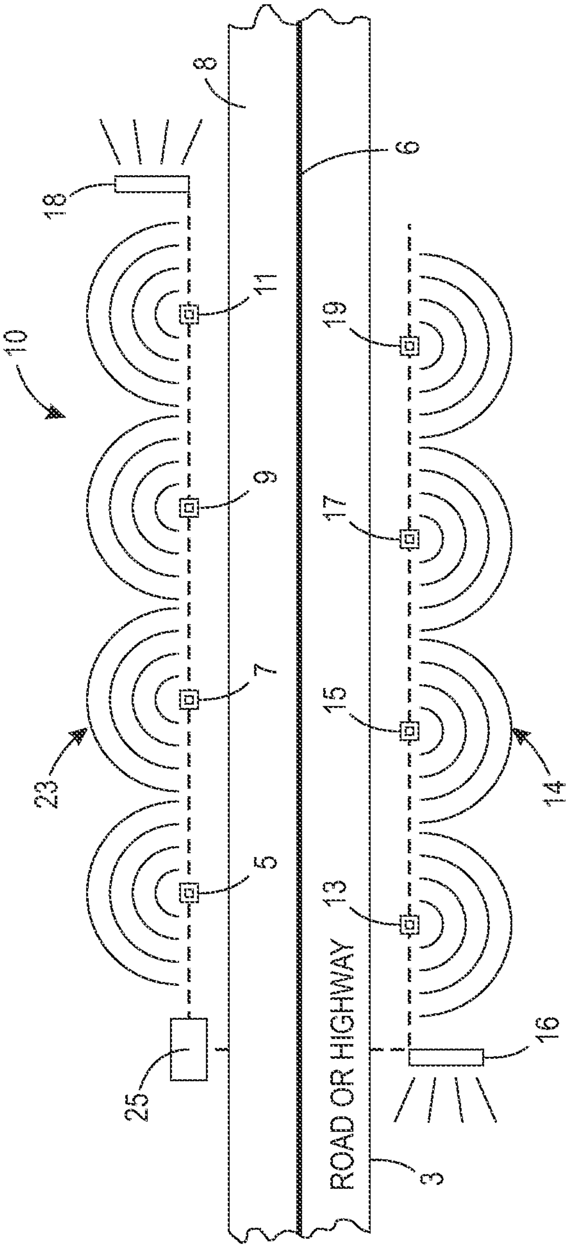
FIG. 1 illustrates a schematic diagram of a system 10 that can actively set a local speed limit on a road or highway based on the probability that wildlife or other moving hazard is nearby, in accordance with a preferred embodiment.

FIG. 1 illustrates a schematic diagram of a system 10 that can actively set a local speed limit on a road or highway based on the probability that wildlife or another moving hazard is nearby, in accordance with a preferred embodiment. The system 10 can be installed where there are known wildlife traffic patterns such as, for example, deer crossings, livestock traffic, or even pedestrian traffic. The system 10 generally can include one or more active signs 16, 18, one or more detectors 5, 7, 9, 11 and 13, 15, 17, 19, and at least one controller 25. Detectors 5, 7, 9, 11 may be configured in the context of a detector array 23. Detectors 13, 15, 17 and 19 may be configured in the context of a detector array 14. The active signs 16, 18 are configured to display a speed limit and optionally a warning that wildlife or another moving hazard is detected in the vicinity of the road/highway 3. An active sign might be constructed from a LED or incandescent bulb matrix as is commonly used in construction areas. The detectors can be configured, for example, as a series of conventional infrared sensors. Other possible sensors are discussed below. The controller 25 receives the output of the detectors, performs data processing, and outputs display commands to the active signs 16, 18. The communications to and from the controller 25 can be implemented, by example, via infrared, wireless RF, or physical cables. A plan view/schematic of the proposed system 10 is thus shown in FIG. 1.

In some embodiments, after system 10 is initially installed, the controller 25 can invoke a learning mode. During such a learning mode, the normal speed limit is posted and the controller 25 collects a series of timestamped detector events in which one or more detectors are triggered. Over a time period of N days, a frequency distribution is compiled indicating the relative probability of detector triggers versus time of day. Note that many random sources of detector triggers may be equally distributed throughout the day and thus not contribute to a peak.

Figure 2:
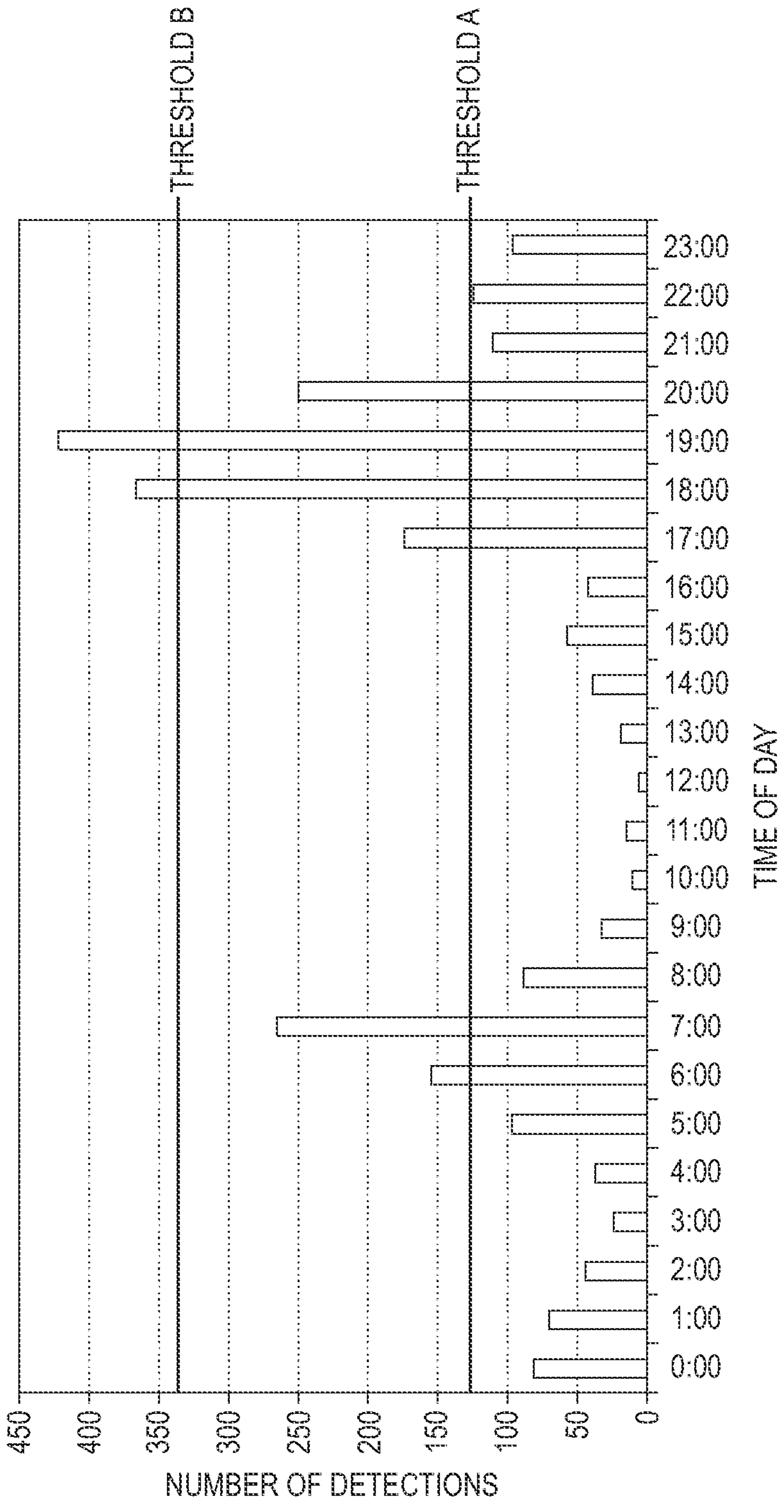
FIG. 2 illustrates an example histogram depicting data indicative of the number of detections versus the time of day with respect to a first threshold ("Threshold A") and a second threshold ("Threshold B"), in accordance with one or more embodiments.

At this point, the controller 25 enters an active mode. During active mode, the controller 25 continues to accumulate a rolling window of the previous N days of detector events. In addition, control laws which have been predefined by the municipality or other governing authority can take effect. In one preferred mode of operation, one or more threshold detection frequencies are established. If the threshold is exceeded during a certain time window, then a lowered speed limit is displayed during that time window. Multiple thresholds and corresponding speed limits can be invoked, as shown in FIG. 2, which illustrates a histogram depicting data indicative of the number of detections versus the time of day with respect to a first threshold (“Threshold A”) and a second threshold (“Threshold B”), In addition to the described active mode in which the speed limit is lowered based on recent detector trigger activity, it is also possible to enable control rules to display a real-time warning message to drivers. The previously cited issue with false triggers can be mitigated by combining the recently learned data with real time detection data. For example, a control rule can be added in which a driver warning such as “Wildlife Detected” can be displayed when a detector is triggered during a time window in which the historical detection frequency exceeds a threshold value. In other words, during times when there has been significant detector triggers, the system takes any new triggers as true positives, not false positives.

The detectors 5, 7, 9, 11 and 13, 15, 17, 19 of respective detector arrays 23 and 14 can be implemented in some embodiments as infrared sensors. A complete sensor with controlling board, only needing a battery pack, costs less than $10, for example. Typically these packages are capable of sensing an animal or other potential hazard at a distance of over 20 feet while offering an effective cone angle of 120 degrees. Some more specialized sensors have longer effective distances.

Although the statistics for deer are included herein, there are many species which cause these collisions, some much more catastrophic, like moose. The disclosed embodiments could also serve to protect endangered species. Embodiments may also be adapted for use by municipalities to help prevent animal-vehicle collisions, especially in areas with high incidence of animal-vehicle collisions. Testing the effectiveness of municipal control rules would be easy as most collisions are tracked. If sections of roads, for examples, were monitored the results could be compared to unmonitored sections, giving the operators proof of how effective the system is. By controlling a local speed limit, it is expected that driver behavior will be affected more so than by a static or flashing sign. The managed section of roadway becomes effectively a dynamic speed enforcement zone based on actual safety conditions. There is potential for insurance companies or other companies to license or sponsor systems such as system 10 because insurance claims will decline.

Although reference is made herein to infrared sensors, it can be appreciated that alternative systems/methods for sensing animals or other hazards can include the use of laser “trip” sensors which sense when an animal breaks a laser beam. One or more of the detectors shown in FIG. 1, for example, could be implemented as such a laser “trip” sensor. Additionally, Forward Looking InfraRed (FLIR) sensors may be adapted for use as a detector. Although these sensors are more expensive, they function over long distances so a single sensor could monitor a large area. Other types of detectors that can be adapted for use in accordance with alternative embodiments include, for example, radar-based sensors and geomicrophones (detecting ground vibrations caused by deer movement).

Figure 3:
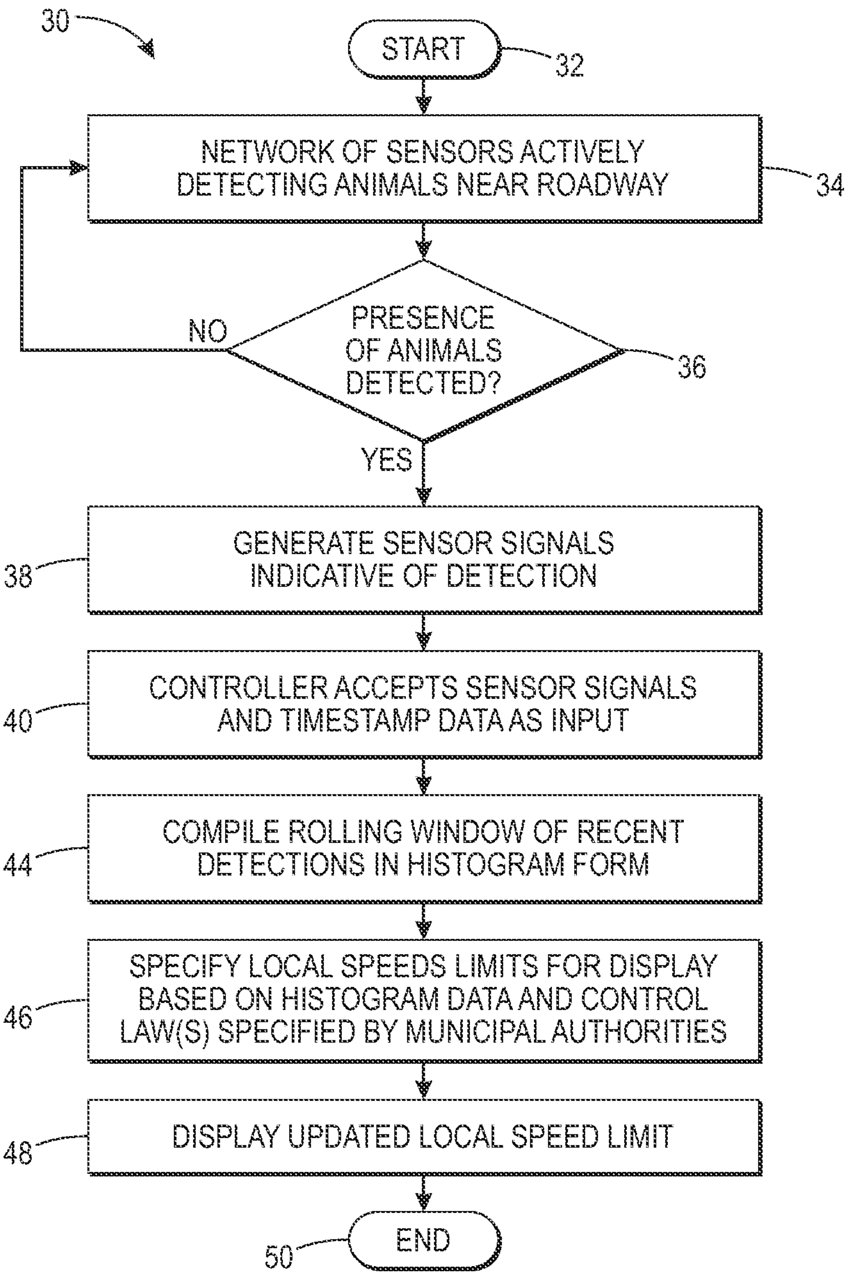
FIG. 3 illustrates a high-level flow chart of operations depicting logical operational steps of a method for implemementing an automated warning system (e.g., such as system 10 shown in FIG. 1) for the prevention of animal-vehicle (or non-animal/vehicle) accidents, in accordance with an alternative embodiment.

FIG. 3 illustrates a high-level flow chart of operations depicting logical operational steps of a method 30 implementing an automated warning system (e.g., such as system 10 shown in FIG. 1) for the prevention of animal-vehicle (or non-animal/vehicle) accidents, in accordance with an alternative embodiment. It can be appreciated that the methodology shown in FIG. 3 can be implemented in accordance with the embodiment of system 10 shown in FIG. 1, or may be implemented in accordance with other embodiments. In any event, the process begins as shown at block 34 wherein a network of sensors actively detects animals near or proximate to a roadway. Next, as shown at decision block 36, a test can be performed to determine if the presence of animals is detected.

If so, then the steps continue to block 38 (i.e. “YES”). If not (i.e., “NO), then the operation shown at block 34 is repeated until the presence of animals (or other moving objects, not necessarily animals) is detected. Assuming that animals or other objects have been detected, then as shown at block 38, a step or logical operation can be implemented for generating sensor signals indicative of such a detection (or multiple detections in some instances). Next, as depicted at block 40, a step or logical operation can be implemented wherein a controller accepts such sensor signals and timestamp data.

Thereafter, as shown at block 44, a step or logical operation can be implemented in which a rolling window of recent animal detections is compiled in histogram form. Then, as shown at block 46, local speed limits can be specified for display based on the compiled histogram data and control law(s) specified by local municipal authorities (or other appropriate governing bodies). Finally, as shown at block 48, updated local speed limits are displayed via, for example, the active signs 16, 18 shown in FIG. 1. The process can then terminate, as illustrated at block 50.

Figure 5:
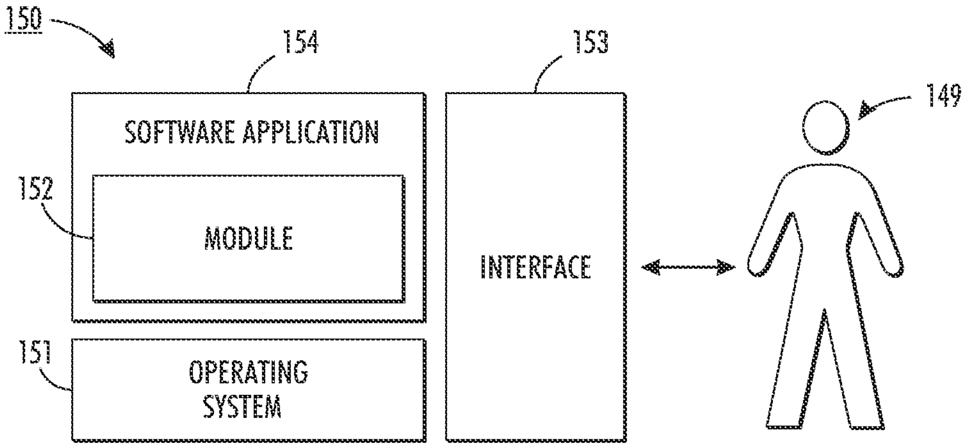
FIG. 5 illustrates a computer software system, which may be employed in some embodiments for directing the operation of the data-processing system depicted in FIG. 4.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module". An example of such a module is illustrated in FIG. 5 as module 152.

The disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the system's computer or mobile device, partly on the system's computer, as a stand-alone software package, partly on the system's computer and partly on a remote computer or entirely on the remote computer. In the latter scenario, the remote computer may be connected to the system's computer through a local area network (LAN) or a wide area network (WAN), wireless data network e.g., WiFi, WiMax, 802.11x, and cellular network or the connection can be made to an external computer via most third party supported networks (e.g. through the Internet via an Internet service provider).

The embodiments are described at least in part herein with reference to flowchart illustrations and/or block diagrams of methods, systems, and computer program products and data structures according to some embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing systems, create means for implementing the functions/acts specified in the block or blocks discussed herein such as, for example, the various instructions, modules, etc., discussed herein. Examples of methods that can be implemented in this manner include, for example, method 30 shown in FIG. 3 and method 200 depicted in FIG. 6.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 4:
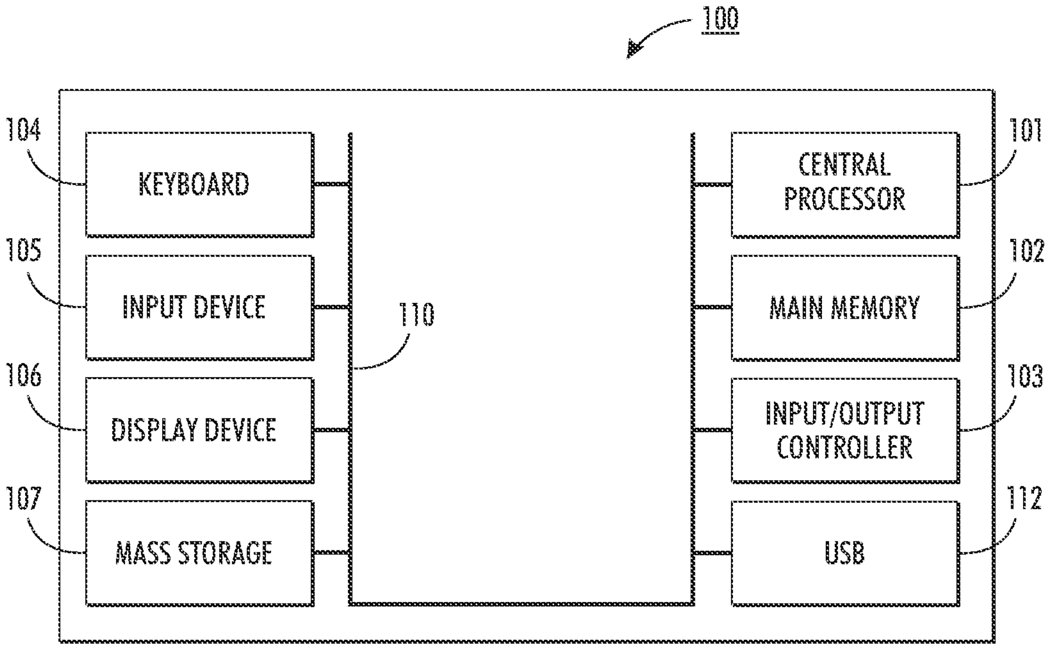
FIG. 4 illustrates a schematic view of a data-processing system which can be implemented in accordance with the disclosed embodiments.

FIGS. 4-5 are provided as exemplary diagrams of data-processing environments in which some embodiments can be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, the disclosed embodiments may be implemented in the context of a data-processing system 100 that includes, for example, a central processor 101 (or other processors), a main memory 102, an input/output controller 103, and in some embodiments, a USB (Universal Serial Bus) 112 or other appropriate peripheral connection. System 100 can also include a keyboard 104, an input device 105 (e.g., a pointing device such as a mouse, track ball, pen device, etc.), a display device 106, and a mass storage 107 (e.g., a hard disk). As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 5 illustrates a computer software system 150, which may be employed for directing the operation of the data-processing system 100 depicted in FIG. 4. Software application 154, stored in main memory 102 and/or on mass storage 107 depicted in FIG. 4 generally includes and/or can be associated with a kernel or operating system 151 and a shell or interlace 153. One or more application programs, such as module(s) 152, may be "loaded" (e.g., transferred from mass storage 107 into the main memory 102) for execution by the data-processing system 100. In the example shown in FIG. 5, module 152 can be implemented as, for example, a module that performs various logical instructions or operations such as those shown in, for example, FIG. 4, and described with respect to other figures herein.

The data-processing system 100 can receive user commands (e.g., from a user such as user 149 shown in FIG. 5) and data through user interface 153 accessible by the user 149. These inputs may then be acted upon by the data-processing system 100 in accordance with instructions from operating system 151 and/or software application 154 and any software module(s) 152 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 152) can include, but are not limited to, routines, subroutines, software applications, programs, objects, components, data structures, etc., which perform particular tasks or implement particular abstract data types and instructions. Moreover, those skilled in the art will appreciate that the disclosed embodiments may be practiced with other computer system configurations such as, for example, hand-held devices, multi-processor systems, data networks, microprocessor-based or programmable consumer electronics, networked personal computers, minicomputers, mainframe computers, servers, and the like. Module 152 can implement instructions such as the instructions, steps or logical operations of method 30 shown in FIG. 3 and/or method 200 depicted in FIG. 6.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153 (e.g., a graphical user interface) can serve to display results, whereupon a user may supply additional inputs or terminate a particular session. In some embodiments, for example, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153.

FIGS. 4-5 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 6:
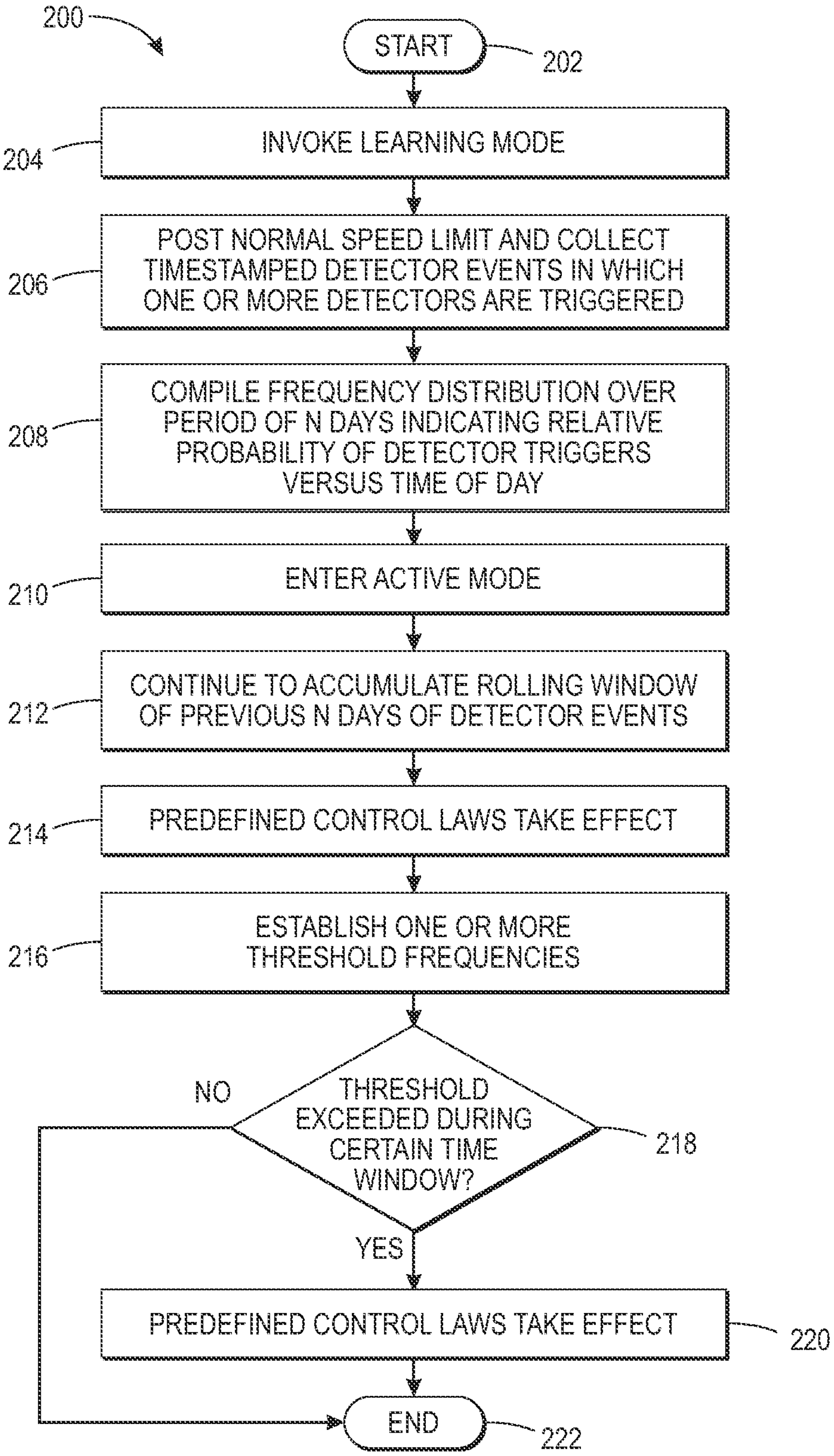
FIG. 6 illustrates a high-level flow chart of operations depicting logical operational steps of a method for the prevention of accidents between vehicles and animals (or other hazards) with respect to a road or highway, in accordance with an alternative embodiment.

FIG. 6 illustrates a high-level flow chart of operations depicting logical operational steps of a method 200 for the prevention of accidents between vehicles and animals (or other hazards) with respect to a road or highway, in accordance with an alternative embodiment. The method 200 shown in FIG. 6 generally combines improved driver speed regulation and a reduction in false triggers. The process begins, as shown at block 202. After the system 10 shown in FIG. 1, for example, is first installed, the controller 25 can invoke a learning mode as depicted at block 204.

During this learning mode, the normal speed limit can be posted and the controller 25 can collect a series of timestamped detector events in which one or more detectors are triggered, as described at block 206. Over a time period of N days, a frequency distribution can be compiled indicating the relative probability of detector triggers versus the time of day, as shown at block 208. As indicated previously, many random sources of detector triggers may be equally distributed throughout the day and thus not contribute to a peak.

At this point, the controller 25 can enter an active mode, as indicated at block 210. During the active mode, the controller 25 can continue to accumulate a rolling window of the previous N days of detector events, as depicted at block 212. In addition, control laws which have been predefined by the municipality can take effect, as described at block 214. In one particular but preferred mode of operation, one or more threshold detection frequencies can be established, as illustrated at block 216. If the threshold is exceeded during a certain time window, as shown at block 218, then a lowered speed limit can be displayed during that time window, as depicted thereafter at block 220. Multiple thresholds and corresponding speed limits can be invoked, as indicated by the graph/histogram shown in FIG. 2. The process can then terminate, as indicated at block 222.

Based on the foregoing, it can be appreciated that a number of preferred and alternative embodiments are disclosed herein. For example, in one embodiment, a method can be implemented for preventing collisions between vehicles and moving hazards. Such a method can include, for example, the steps or logical operations of generating sensor signals indicative of a plurality of detections of moving hazards via a network of sensors with respect to a roadway, processing the sensor signals with respect to display commands to be output to at least one active sign located adjacent the roadway, compiling a histogram of recent detections from among the plurality of detections, and adjusting the local speed limit for display via the at least one active sign based on data derived from the histogram in association with at least one specified control law to influence driving behavior of drivers of vehicles along the roadway.

In another embodiment, the step or logical operation of compiling a histogram of recent detections from among the plurality of detections can further include steps or logical operations for: during a learning mode collect a plurality of timestamped detector events from the sensor signals; during the learning mode compile a frequency distribution over a period of N days indicating a relative probability of detector triggers from the sensor signals versus a time of day; during an active mode accumulate a rolling window of the period of N days of detector events in order to compile the histogram based on the frequency distribution.

In another embodiment, a system for preventing collisions between vehicles and moving hazards can be implemented. Such a system can include, for example, a processor, a data bus coupled to the processor; and a computer-usable medium embodying computer program code, the computer-usable medium being coupled to the data bus. The computer program code can include instructions executable by the processor and configured, for example, for generating sensor signals indicative of a plurality of detections of moving hazards via a network of sensors with respect to a roadway; processing the sensor signals with respect to display commands to be output to at least one active sign located adjacent the roadway; compiling a histogram of recent detections from among the plurality of detections; and adjusting the local speed limit for display via the at least one active sign based on data derived from the histogram in association with at least one specified control law to influence driving behavior of drivers of vehicles along the roadway.

In another embodiment, the aforementioned instructions for compiling a histogram of recent detections from among the plurality of detections can further include instructions for: during a learning mode, collect a plurality of time stamped detector events from the sensor signals; during the learning mode, compile a frequency distribution over a period of N days indicating a relative probability of detector triggers from the sensor signals versus a time of day; and during an active mode, accumulate a rolling window of the period of N days of detector events in order to compile the histogram based on the frequency distribution.

In yet another embodiment, a system for preventing collisions between vehicles and moving hazards can be implemented. Such a system can include, for example, a network of sensors for generating sensor signals indicative of a plurality of detections of moving hazards with respect to a roadway; at least one processor for processing the sensor signals with respect to display commands to be output to at least one active sign located adjacent the roadway and for compiling a histogram of recent detections from among the plurality of detections; and at least one controller for adjusting the local speed limit for display via the at least one active sign based on data derived from the histogram in association with at least one specified control law to influence driving behavior of drivers of vehicles along the roadway.

In another embodiment, the at least one processor for compiling a histogram of recent detections from among the plurality of detections can further process instructions for the following: during a learning mode collect a plurality of time stamped detector events from the sensor signals; during the learning mode compile a frequency distribution over a period of N days indicating a relative probability of detector triggers from the sensor signals versus a time of day; and/or during an active mode accumulate a rolling window of the period of N days of detector events in order to compile the histogram based on the frequency distribution.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for preventing collisions between vehicles and moving hazards, said method comprising:

generating sensor signals indicative of a plurality of detections of moving hazards via a network of sensors with respect to a roadway;

processing said sensor signals with respect to display commands to be output to at least one active sign located adjacent said roadway;

compiling a histogram of recent detections from among said plurality of detections by: during a learning mode collecting a plurality of timestamped detector events from said sensor signals, during said learning mode compiling a frequency distribution over a period of N days indicating a relative probability of detector triggers from said sensor signals versus a time of day, and during an active mode accumulating a rolling window of said period of N days of detector events in order to compile said histogram based on said frequency distribution; and adjusting said local speed limit for display via said at least one active sign based on data derived from said histogram in association with at least one specified control law to influence driving behavior of drivers of vehicles along said roadway.

2. The method of claim 1 further comprising invoking said learning mode via a controller.

3. The method of claim 1 wherein at least one sensor among said network of sensors comprises an infrared detector.

4. The method of claim 1 wherein at least one sensor among said network of sensors comprises a laser trip sensor.

5. The method of claim 1 wherein at least one sensor among said network of sensors comprises a Forward Looking Infra-Red (FLIR) sensor.

6. The method of claim 1 wherein at least one sensor among said network of sensors comprises a radar-based sensor.

7. The method of claim 1 wherein at least one sensor among said network of sensors comprises a geomicrophone.

8. A system for preventing collisions between vehicles and moving hazards, said system comprising:

a processor;

a data bus coupled to said processor; and a computer-usable medium embodying computer program code, said computer-usable medium being coupled to said data bus, said computer program code comprising instructions executable by said processor and configured for:

generating sensor signals indicative of a plurality of detections of moving hazards via a network of sensors with respect to a roadway;

processing said sensor signals with respect to display commands to be output to at least one active sign located adjacent said roadway;

compiling a histogram of recent detections from among said plurality of detections by: during a learning mode collecting a plurality of timestamped detector events from said sensor signals, during said learning mode compiling a frequency distribution over a period of N days indicating a relative probability of detector triggers from said sensor signals versus a time of day, and during an active mode accumulating a rolling window of said period of N days of detector events in order to compile said histogram based on said frequency distribution; and adjusting said local speed limit for display via said at least one active sign based on data derived from said histogram in association with at least one specified control law to influence driving behavior of drivers of vehicles along said roadway.

9. The system of claim 8 further comprising a controller that invokes said learning mode.

10. The system of claim 8 wherein at least one sensor among said network of sensors comprises an infrared detector.

11. The system of claim 8 wherein at least one sensor among said network of sensors comprises a laser trip sensor.

12. The system of claim 8 wherein at least one sensor among said network of sensors comprises a Forward Looking Infrared (FLIR) sensor.

13. The system of claim 8 wherein at least one sensor among said network of sensors comprises a radar-based sensor.

14. The system of claim 8 wherein at least one sensor among said network of sensors comprises a geomicrophone.

15. A system for preventing collisions between vehicles and moving hazards, said system comprising:

a network of sensors for generating sensor signals indicative of a plurality of detections of moving hazards with respect to a roadway;

at least one processor for processing said sensor signals with respect to display commands to be output to at least one active sign located adjacent said roadway and for compiling a histogram of recent detections from among said plurality of detections by: during a learning mode collectins a plurality of timestamped detector events from said sensor signals, during said learning mode compiling a frequency distribution over a period of N days indicating a relative probability of detector triggers from said sensor signals versus a time of day, and during an active mode accumulating a rolling window of said period of N days of detector events in order to compile said histogram based on said frequency distribution; and at least one controller for adjusting said local speed limit for display via said at least one active sign based on data derived from said histogram in association with at least one specified control law to influence driving behavior of drivers of vehicles along said roadway.

16. The system of claim 15 wherein said at least one controller invokes said learning mode.

17. The system of claim 15 wherein at least one sensor among said network of sensors comprises an infrared detector.

18. The system of claim 15 wherein at least one sensor among said network of sensors comprises a laser trip sensor.

19. The system of claim 15 wherein at least one sensor among said network of sensors comprises a Forward Looking Infrared (FLIR) sensor.

20. The system of claim 15 wherein at east one sensor among said network of sensors comprises at least one of a radar-based sensor and a geomicrophone.

* * * * *